Patented Oct. 30, 1928.

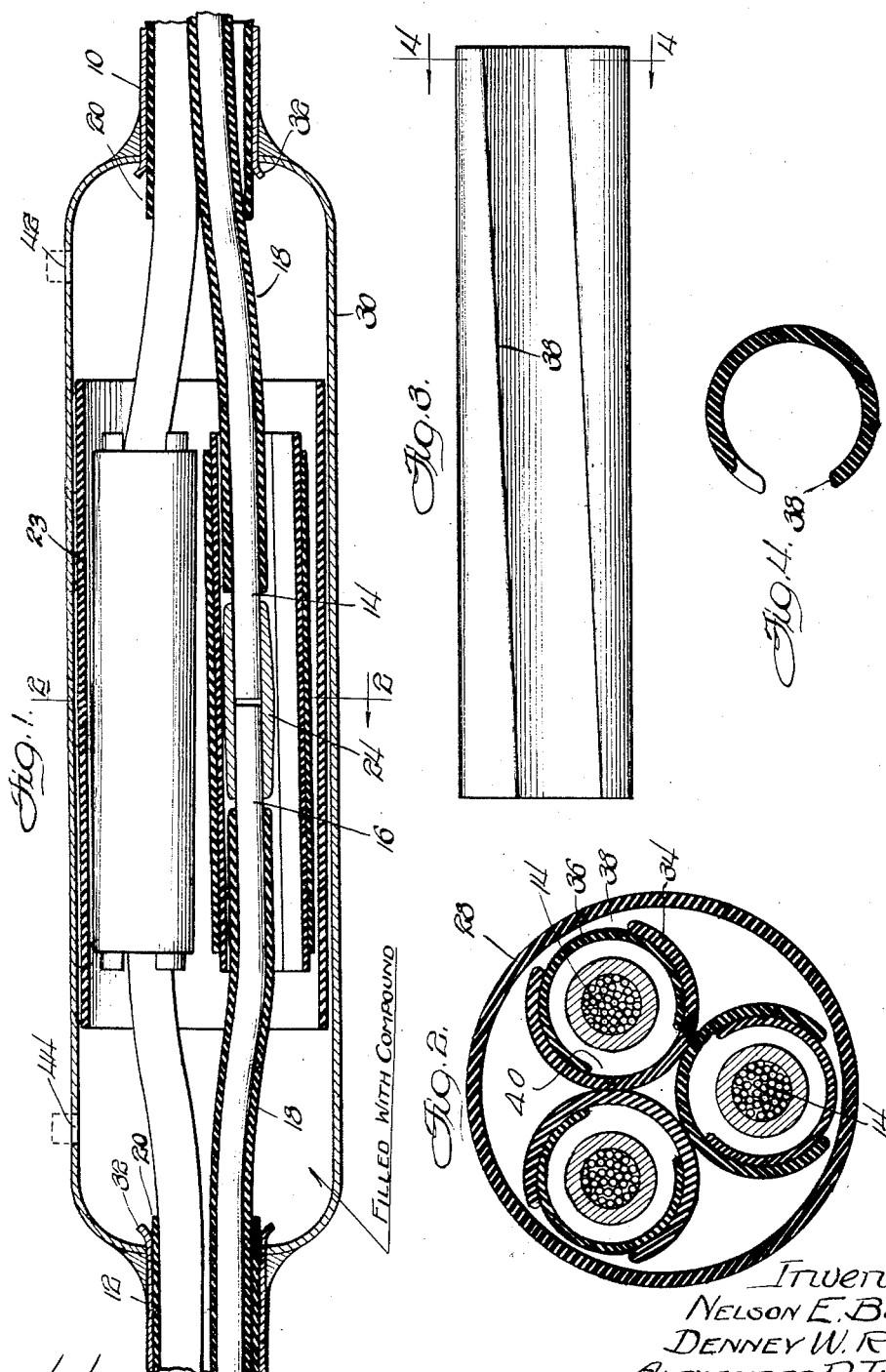

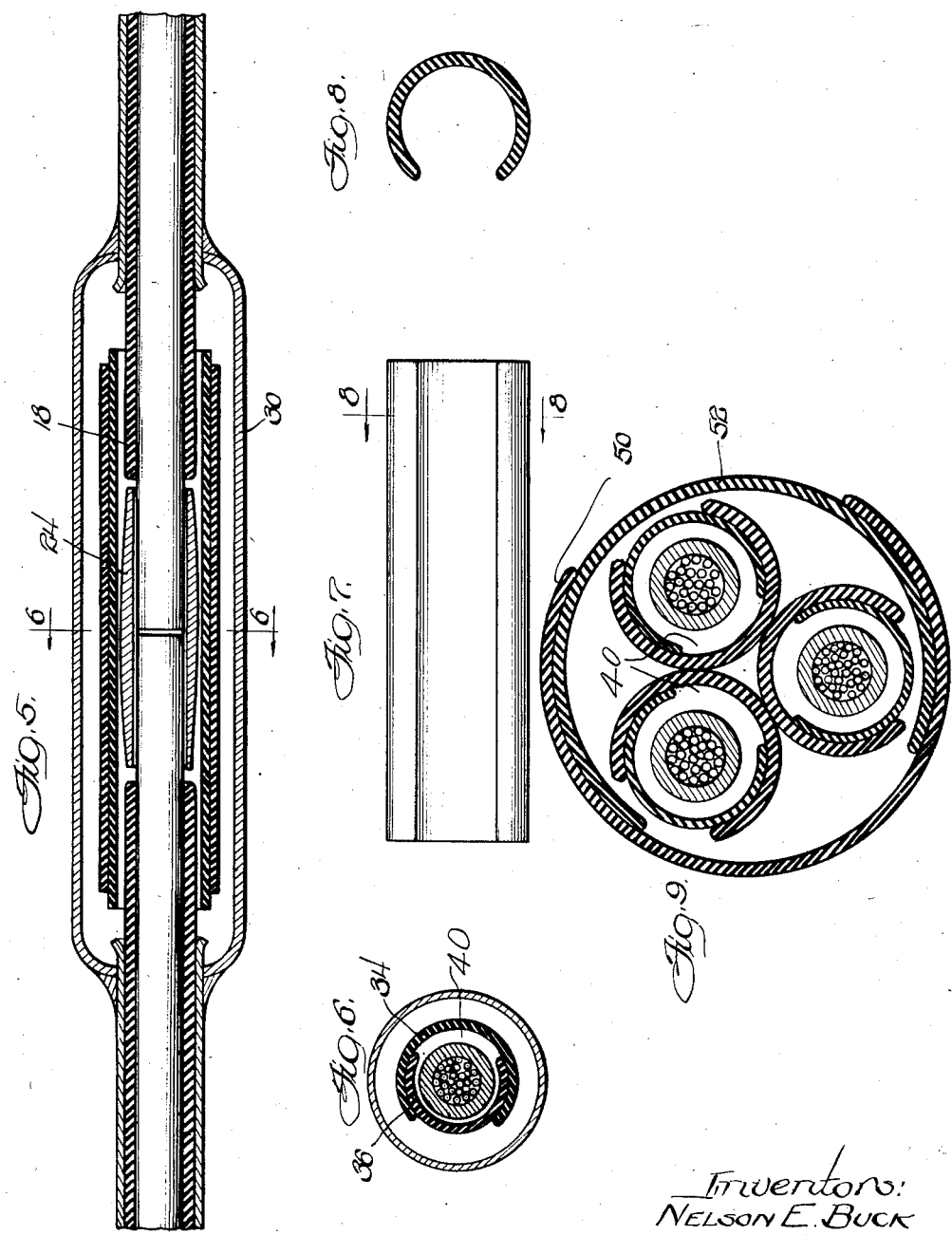

1,689,420

UNITED STATES PATENT OFFICE.

NELSON E. BUCK, DENNEY W. ROPER, AND ALEXANDER P. THOMS, OF CHICAGO, ILLINOIS.

CABLE JOINT.

Application filed March 26, 1923. Serial No. 627,604.

Our invention relates to equipment for the electrical transmission of power, and more specifically to an improved cable joint. The type of cable in connection with which the joint has been illustrated is commonly employed in underground conduits. The length of the completed joint need be no greater than that required for the proper separation of the conductors from each other and from the sheath to secure the necessary insulation.

Another object is to completely encircle each individual conductor with an individual insulating sleeve that can be put in place laterally.

Another object is to effectively eliminate as far as possible, air pockets or voids in a construction in which certain parts have surface contact with each other.

All the objects and advantages above mentioned are obtained in the present structure to a greater degree than in the structures of the prior art, without sacrificing any of the advantages of perfect filling, freedom from air bubbles, and helical arrangement of the conductors throughout the joint, set forth in our prior application, Serial No. 522,761, filed December 16, 1921.

In the embodiment of the invention selected for illustration in the accompanying drawings:

Figure 1 is a view in the nature of a longitudinal section through a joint according to the invention the upper phase conductor and its sleeve in this view being shown as raised out of contact with the lower phase conductor sleeve;

Fig. 2 is a cross sectional view of the outer belt and the inner sleeves and conductors of a joint such as is shown in Fig. 1, showing the phase conductor sleeves in contact.

Fig. 3 is a side elevation of one of the individual insulating sleeve members; and Fig. 4 is a section on line 4—4 of Fig. 3;

Fig. 5 is a section of a joint in which the cable comprises a single conductor only;

Fig. 6 is a section on line 6—6 of Fig. 5;

Fig. 7 is a side view of one of the sleeve elements; and

Fig. 8 is a section on line 8—8 of Fig. 7;

Fig. 9 is a section similar to Fig. 2 of a modified form of construction.

In the embodiment of the invention selected for illustration in Figures 1 to 4 inclusive, the opposed cable ends 10 and 12 containing conductors 14 and 16 respectively, each covered with individual insulation 18, and all enclosed in an outer layer 20 of insulation, represents any of the well known types of cable construction at present known to the art.

The lead sleeve 30 is slipped over one of the cables, such as 12, and the ends of the cable sheaths belled at 32 as usual. Outer belt insulating sleeve 28 is also slipped over one of the cable ends.

The individual conductor ends are now bared of insulation, properly juxtaposed, and united by the usual copper splicing sleeves 24. The portion bared on each individual conductor and an adjacent portion of the insulated conductor each side of the bared portion is now completely enclosed by individual tubular insulating means. If these individual insulating devices had to be installed in the same way as sleeves 30 and 28, by sliding them longitudinally along the conductors they encircle, before the ends are joined, casing 30 would be lengthened by an amount almost equal to the length of the conductor insulating sleeve.

On account of the lay in the conductors in the cable it is necessary to straighten out the insulated conductors or else use a relatively larger conductor insulating tube before the latter can be displaced longitudinally along the conductor. And this straightening of the insulated conductors required with the large insulating tubes frequently damages the conductor insulation. These difficulties are obviated by the present invention.

According to the invention, each individual conductor is enclosed in a two-part insulating sleeve having longitudinal slots in the parts of such widths that the insulating sleeves can be applied laterally to the conductor. Before placing the two-part conductor insulating sleeve around the conductor, the two parts are telescoped and the slots brought into register. Then after being applied to the conductor, the parts are rotated to bring the slots approximately opposite to the position in which they register.

Referring to Figure 2, each conductor 14 is enclosed by an outer insulating part 34 and an inner part 36 slotted at 38 and 40 respectively.

The two concentric parts are first assembled with the slots coinciding. This assembly is slipped laterally over the joined conductor and is turned to a position where the registering slots face outwardly. The inner part 36 is then rotated until its slot faces inwardly approximately 180° out of register, with the outer slot.

The outer part 34 in Fig. 2 is shown as being thicker than the inner part 36. This may be varied. The thicknesses of the parts 28, 34 and 36 are varied with the voltage and the relative thickness of the several parts may be varied to secure the most economical design.

We prefer not to entirely straighten out the helical twist of the individual conductors in the cable, but to let this helical twist remain in part throughout the joint to avoid injury to the conductor insulation. In order to do this slots 40 and 38 are cut at an angle or helically as indicated in Figures 3 and 4. While, in assembled position, the resulting structure does not have a true helical configuration with respect to the axis of the joint as a whole, it is a sufficiently close approximation to be entirely satisfactory for all practical purposes.

It will be obvious that if the individual sleeves have a slight helical tilt, they will not make line contact with each other anywhere, but will have contact with each other on substantially the plane of the section line for Figure 2, which will be as nearly point contact as the rigidity of the material and the accuracy with which the shapes are formed will permit. It will also be apparent that since the axis of part 34 is not parallel to the axis of sleeve 28, it will rest against sleeve 28, if at all, only at its opposite ends, and that the contacts there will also be substantially point contacts. Throughout the entire joint, substantially the only elements having greater than point contact, will be parts 34 and 36. In order to prevent entrained air between these two insulating parts, an insulating compound is applied to the meeting surfaces of the parts before they are telescoped. We find it desirable to employ for this purpose and for the filling of the joint, a greasy compound of the same general character as is used for impregnating the paper insulation of the cable.

After assembly, the joint is filled through openings 42 and 44 in the usual way, as set forth in our co-pending application hereinabove referred to.

Figure 5 shows an analogous construction for a cable containing a single conductor. In this form the slot in the parts 34 and 36 may be straight longitudinal slots.

On the single conductor cable this design allows the construction of a joint of smaller diameter, as with the slotted insulators it is not necessary to have the diameter larger than the lead sleeve of the cable.

Without further elaboration, the foregoing will so fully explain the gist of the invention, that others may, by applying current knowledge, readily adapt the same for use under various conditions of service. It will, for instance, be obvious that the outer sleeve 28 might be formed in two parts, if desired, such as slotted members 50 and 52 in Figure 9. These and many other modifications and adaptations may readily be made by those skilled in the art without eliminating certain features which may properly be said to constitute the essential items of novelty involved, which items are intended to be defined and secured to us by the following claims.

We claim:—

1. In a cable joint, in combination, juxtaposed and joined conductor ends, and two telescoped insulating sleeves each slotted to admit said ends laterally, said sleeves being rotated when in final position to move their slots out of register and form an insulating barrier completely encircling said conductor ends.

2. In a cable joint, in combination, juxtaposed and joined conductor ends, and two telescoped insulating sleeves each slotted to admit said ends laterally, said sleeves being rotated when in final position to move their slots out of register and form an insulating barrier completely encircling said conductor ends, the slots in said sleeves being helical.

3. In a cable joint, the combination of two sleeves fitting each other in telescopic engagement, each sleeve having a slot wide enough to admit the conductor laterally without distortion of the sleeve.

4. In a cable joint, in combination, a plurality of individual conductors and connections uniting the same in pairs, said conductors and connections running through the joint with substantially the same helical twist as the conductors in the cable, and individual insulating sleeve means completely encircling said connections and the conductor ends adjacent, said sleeves having substantially true cylindrical outer surfaces, and having their axes disposed in non parallel relation with respect to each other, whereby their contact with each other is substantially at points only.

5. In a cable joint, in combination, a plurality of individual conductors and connections uniting the same in pairs, said conductors and connections running through the joint with substantially the same helical twist as the conductors in the cable, individual insulating sleeve means completely encircling said individual connections and the conductor ends adjacent, said sleeves having substantially true cylindrical outer surfaces and angularly disposed in the direction of the several conductors which they contain, whereby their contact with each other is substantially at a single point only, and a sleeve enclosing all said individual sleeves, said enclosing sleeve having a substantially cylindrical inner surface, whereby it makes substantially point contact with said angularly disposed individual sleeves.

6. In a cable joint, in combination, a plurality of conductors, a plurality of separators individual to the conductors providing separate tubular passageways for said conductors, said separators each having their surface in contact at a point with the surface of the adjacent separator inside the joint, all said contacting surfaces being surfaces of revolution, and an insulating filling for the joint, said separators comprising parts telescoped and rotated with respect to each other.

7. In a cable joint, in combination, juxtaposed and joined conductor ends and telescoped insulating sleeves each slotted to admit said ends laterally, said sleeves being rotated when in final position to move their slots out of register and form an insulating barrier completely encircling said conductor, and a film of lubricating material between said sleeves to facilitate said rotation, said lubricating material serving as additional insulation, and excluding gases.

8. In a cable joint for lead covered paper insulated cables, the combination of paper insulated cable conductors having juxtaposed and joined ends, telescoped insulating sleeves for each joined conductor, each sleeve being slotted to admit the joined ends laterally, and said sleeves for each conductor having their slots out of register and forming an insulating barrier completely encircling the corresponding conductor, an outer lead sleeve enclosing said joined conductors and insulating material poured into and filling the remaining spaces in the lead sleeve.

9. In a cable joint, the combination of insulated cable conductors having juxtaposed and joined ends, telescoped insulating sleeves for each conductor, each sleeve being slotted to admit the corresponding joined conductor laterally, and said sleeves having their slots out of register and forming an insulating barrier completely encircling the corresponding conductor, and an outer tubular sleeve of insulation enclosing a plurality of said sets of telescoped sleeves, and extending over the adjacent ends of the cable conductor insulation.

10. In combination, an insulator for use in cable joints including a substantially cylindrical sleeve for housing a portion of a twisted conductor, said sleeve having a slot at one side wide enough to admit the conductor it is to house without distortion of said sleeve, the slot in said sleeve being helical to enable it to receive the said twisted conductor without straightening the same, and a cylindrical closure member for covering the slot to completely enclose the conductor.

11. In combination, a cable joint insulator including a substantially cylindrical insulating sleeve for housing a portion of an electrical conductor of the cable, said sleeve having a slot at one side wide enough to admit the conductor it is to house without distortion of said sleeve, and closure means for covering said slot comprising a second insulating sleeve telescoping the first sleeve and having a slot in its side similar to that in said first sleeve, said slots being normally out of register.

In witness whereof, we hereunto subscribe our names this 21st day of March, 1923.

NELSON E. BUCK.
DENNEY W. ROPER.
ALEXANDER P. THOMS.